US012686327B1

(12) United States Patent
Salter et al.

(10) Patent No.: US 12,686,327 B1
(45) Date of Patent: Jul. 21, 2026

(54) SYSTEMS AND METHODS FOR OPTIMIZING VEHICLE BATTERY USAGE WHILE OPERATING WELCOME LIGHTS

(71) Applicant: Ford Global Technologies, LLC, Dearborn, MI (US)

(72) Inventors: Stuart C. Salter, White Lake, MI (US); John Budaj, West Bloomfield, MI (US); Timothy Thivierge, Jr., Carleton, MI (US); Joshua Talaga, Farmington, MI (US); John Robert Van Wiemeersch, Novi, MI (US); Terry R. Lobsinger, Farmington Hills, MI (US)

( * ) Notice: Subject to any disclaimer, the term of this patent is extended or adjusted under 35 U.S.C. 154(b) by 0 days.

(21) Appl. No.: 19/270,456

(22) Filed: Jul. 15, 2025

(51) Int. Cl.
| | |
|---|---|
| *B60Q 1/00* | (2006.01) |
| *B60L 58/12* | (2019.01) |
| *B60Q 1/24* | (2006.01) |
| *H05B 47/115* | (2020.01) |
| *H05B 47/175* | (2020.01) |

(52) U.S. Cl.
CPC .............. *B60Q 1/247* (2022.05); *B60L 58/12* (2019.02); *H05B 47/115* (2020.01); *H05B 47/1965* (2024.01); *B60Q 2400/40* (2013.01); *B60Q 2900/50* (2022.05)

(58) Field of Classification Search
CPC .. B60Q 1/247; B60Q 400/40; B60Q 2400/40; B60L 58/12; H05B 47/115; H05B 47/1965
See application file for complete search history.

(56) References Cited

U.S. PATENT DOCUMENTS

| | | | |
|---|---|---|---|
| 9,321,395 B2 * | 4/2016 | Ammar .................... | B60Q 1/32 |
| 9,821,707 B2 * | 11/2017 | Decaluwe ............ | H05B 47/115 |
| 9,858,735 B2 | 1/2018 | Spahl et al. | |
| 10,284,822 B2 * | 5/2019 | Murar .................... | B60K 35/21 |
| 11,021,098 B1 * | 6/2021 | Brown ................ | H05B 47/105 |
| 11,580,798 B2 | 2/2023 | Weber et al. | |
| 12,097,797 B2 | 9/2024 | Schmidt et al. | |
| 12,513,804 B1 * | 12/2025 | Salter .................. | H05B 47/125 |

FOREIGN PATENT DOCUMENTS

| | | |
|---|---|---|
| CN | 110949236 A | 4/2020 |
| CN | 111409540 A | 7/2020 |
| CN | 117279167 A | 9/2023 |

OTHER PUBLICATIONS

Citroen, C4 X Owner's Manual, https://ownersmanuals2.com/citroen/c4-x-2025-owners-manual-104912, Jan. 15, 2025, pp. 1-224.

* cited by examiner

*Primary Examiner* — Robert J May
(74) *Attorney, Agent, or Firm* — Frank Lollo; Eversheds Sutherland (US) LLP

(57) ABSTRACT

A vehicle including a sensor unit, a plurality of exterior lights, a battery and a processor is disclosed. The sensor unit may detect a presence and a movement of a portable device in proximity to the vehicle. The processor may identify one or more parameters associated with the presence and the movement of the portable device in proximity to the vehicle based on inputs obtained from the sensor unit. The processor may further control an operation of the exterior lights based on the parameters and/or a state of charge (SoC) level of the battery.

15 Claims, 4 Drawing Sheets

400

402 — Start

404 — Obtain inputs from sensor unit

406 — Identify parameters associated with presence and movement of portable device 408 — Identify a real-time battery SoC level 410 — Control operation of exterior lights based on identified parameters and/or SoC level 412 — Stop

SYSTEMS AND METHODS FOR OPTIMIZING VEHICLE BATTERY USAGE WHILE OPERATING WELCOME LIGHTS

FIELD

The present disclosure relates to vehicles and more specifically to systems and methods for optimizing vehicle battery usage while operating welcome lights.

BACKGROUND

Modern vehicles incorporate a plurality of features that enhance user's experience of operating the vehicles. One such feature is welcome lights or approach lights. Welcome lights of a vehicle are exterior or interior lights that automatically turn on when the user approaches the vehicle. The purpose of this lighting feature is to "greet" the user when the user approaches the vehicle, illuminate the areas close to the vehicle to make the approach convenient and comfortable for the user, and enhance the vehicle's aesthetic appeal.

While the welcome lights provide convenience to the users, these lights are typically activated when the vehicle engine is OFF and hence they consume battery energy. Efforts are being made to reduce the vehicle's key-off load (KOL), including optimizing the operation of welcome lights to reduce battery energy consumption.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
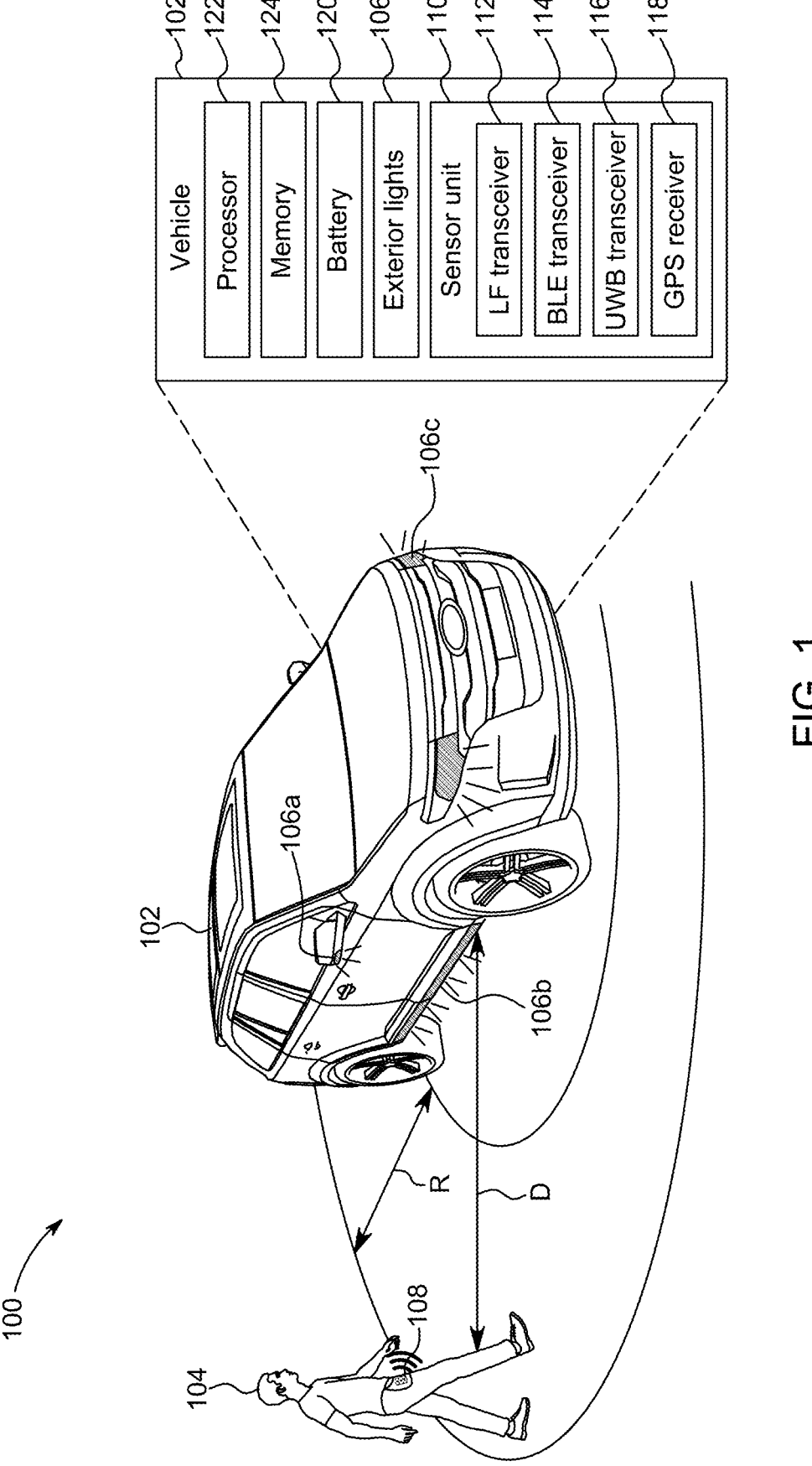
FIG. 1 depicts an environment in which techniques and structures for providing the systems and methods disclosed herein may be implemented.

The present disclosure describes a vehicle that incorporates "welcome lighting" or approach lighting feature. The vehicle activates this feature whenever a user approaches the vehicle. Specifically, the vehicle activates one or more of its exterior (and/or interior) lights when the user approaches the vehicle and is within a predefined distance range of the vehicle. Examples of such lights (collectively referred to as "welcome lights") include, but are not limited to, puddle lights, running board lights, headlights, etc.

In some aspects, the vehicle detects the user's approach towards the vehicle by detecting the presence of user's phone (used as Phone-as-a-key (PaaK)) and/or key fob in proximity to the vehicle. It is known that the vehicle detects the presence of key fob in proximity to the vehicle by transmitting Low Frequency (LF) polling or challenge messages/signals to the key fob, and receiving Ultra High Frequency (UHF) signals in return from the key fob. Further, the vehicle detects the presence of the user's phone (PaaK) in proximity to the vehicle by transmitting (and receiving in return) Bluetooth Low Energy (BLE) and Ultra-Wideband (UWB) signals. The BLE signals help in detecting the phone's presence, and the UWB signals help in detecting the precise location of the user's phone in proximity to the vehicle.

It may be appreciated that the transmission of LF/BLE/UWB signals and the activation of welcome lights may consume vehicle battery's energy, especially because these lights are illuminated when the vehicle engine is OFF. To reduce the vehicle's key off load (KOL), the vehicle disclosed in the present disclosure implements a plurality of energy optimization strategies, which are briefly described below.

Conventionally, the vehicle illuminates the welcome lights whenever the vehicle detects that the user's phone and/or key fob (collectively referred to as "portable device") are located within a predefined range of the vehicle. For example, the vehicle conventionally illuminates the welcome lights whenever the portable device is located within 10-15 feet of the vehicle. In accordance with one exemplary aspect of the present disclosure, the vehicle reduces this range based on a state of charge (SoC) level of the vehicle battery. For example, the vehicle may illuminate the welcome lights whenever the portable device is located within 10-15 feet of the vehicle when the battery SoC level is 75% or more. As the SoC level starts to decrease, the vehicle may reduce this range (e.g., to 8 feet, then to 6 feet, then to 4 feet, and so on) with the decreasing SoC level. This facilitates in reducing the battery's energy consumption as the welcome lights illuminate when the user is very close to the vehicle and hence has a higher probability of actually entering the vehicle (as compared to a scenario where the user is just passing by or walking in proximity to the vehicle).

In another exemplary aspect, the vehicle may reduce the time duration for which the welcome lights stay illuminated based on the battery SoC level. For example, the vehicle may illuminate the welcome lights for 30 seconds when the SoC level is 75% or more. As the SoC level starts to decrease, the vehicle may reduce this time duration (e.g., to 20 seconds, then to 15 seconds, then to 10 seconds, and so on) with the decreasing SoC level. This facilitates in reducing the battery's energy consumption as the welcome lights illuminate for a shorter time duration as the SoC level starts to decrease.

In yet another exemplary aspect, the vehicle may detect the side of the vehicle from where the user/portable device is approaching the vehicle and illuminate only those welcome lights that are present on the approach side (and not on other vehicle sides), when the battery SoC level is low. For example, the vehicle may illuminate only those welcome lights that are present on the driver sitting area's side when the user/portable device is approaching the vehicle from the driver sitting area's side and when the battery SoC level is low. This facilitates in reducing the battery's energy consumption as only a subset of welcome lights are illuminated as the user approaches the vehicle. As another approach, with depleting SoC level, the vehicle may illuminate only the puddle light on the driver sitting area's side and not illuminate the running board lights and the headlights, to further conserve battery energy.

In yet another exemplary aspect, the vehicle may reduce the frequency of transmission of LF/BLE/UWB polling signals to the user's phone and/or the key fob, as the SoC level decreases. The vehicle may further reduce the brightness/intensity of the welcome lights as the SoC level decreases. The vehicle may additionally change the color of the welcome lights (e.g., from white to amber) as the SoC level decreases, to provide an indication to the user that the SoC level is depleting.

In yet another exemplary aspect, the vehicle may detect the user/portable device's approach speed towards the vehicle (e.g., by using BLE/UWB signals) and illuminate the welcome lights based on the approach speed. For example, the vehicle may illuminate the welcome lights earlier (when the user is still some distance away from the vehicle, e.g., 10-15 feet) when the user/portable device is approaching the vehicle at a faster speed, and illuminate the welcome lights later (when the user is relatively closer to the vehicle, e.g., 5-7 feet) when the user/portable device is approaching the vehicle at a slower speed. This facilitates in reducing the battery's energy consumption as the welcome lights are not unnecessarily illuminated when the user is approaching slowly towards the vehicle and is still relatively far away from the vehicle.

In yet another exemplary aspect, the vehicle may reduce the predefined range (or the user's distance from the vehicle) at which the vehicle illuminates the welcome lights when the vehicle detects that the user/portable device has approached towards the vehicle a predefined count of times but has not entered the vehicle. For example, the vehicle may reduce the range from 10-15 feet to 4-5 feet when the vehicle detects that the user/portable device has approached towards the vehicle 3 or 4 times but has not entered the vehicle. This helps in preventing unnecessary illumination of the welcome lights when, e.g., the user may be walking to-and-fro adjacent to the vehicle (e.g., talking on the phone) but has no intention of entering the vehicle.

In yet another exemplary aspect, the vehicle may select an optimal welcome light to illuminate based on the user/portable device's distance from the vehicle, and then illuminate the selected optimal welcome light. For example, the vehicle may illuminate only the headlights when the user/portable device is 10-15 feet away from the vehicle, and may additionally (or alternatively) illuminate the puddle lights when the user/portable device gets closer to the vehicle (e.g., within 5-7 feet).

In yet another exemplary aspect, the vehicle may illuminate the welcome lights based on user preferences. For example, based on user preferences, the vehicle may or may not illuminate the welcome lights at specific geolocations (e.g., user's home, office, unknown locations, etc.), during specific times of the day or specific days of the week/year (e.g., not illuminate during the holidays), and/or the like.

The vehicle may further illuminate the welcome lights in a predefined manner (e.g., a first predefined manner) when the user may be carrying a key fob, and in another predefined manner (e.g., a second predefined manner) when the user may be carrying a phone (Paak). As an example, the vehicle may illuminate only the puddle lights when the key fob is detected by the vehicle in its proximity, and may illuminate all the welcome lights when the phone is detected (or vice-versa).

As another strategy to reduce KOL, the vehicle may transmit only BLE/UWB polling signals and not LF signals, when the battery SoC level may be low. As may be appreciated, since transmitting LF signals consumes more battery energy than transmitting BLE/UWB signals, the vehicle stops the transmission of LF signals when the SoC level is low to conserver battery energy. By implementing this strategy, the vehicle detects the presence and movement of only PaaK in proximity to the vehicle to illuminate the welcome lights, and not the key fob.

The present disclosure discloses a vehicle that reduces KOL while operating the welcome lights, especially when the battery SoC level is low. By implementing the strategies disclosed in the present disclosure, the vehicle reduces the battery's energy spend during key off periods, thereby ensuring that the battery has enough energy left to enable the user to conveniently start/crank the vehicle engine. Further, the vehicle uses existing vehicle components to implement the energy optimization strategies disclosed in the present disclosure, and does not require the use of any external components/assistance.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts an environment 100 in which techniques and structures for providing the systems and methods disclosed herein may be implemented. FIG. 1 will be described in conjunction with FIGS. 2 and 3.

The environment 100 may include a vehicle 102 and a user 104. The vehicle 102 may take the form of any passenger or commercial vehicle such as a car, a work vehicle, a crossover vehicle, a van, a minivan, etc. Further, the vehicle 102 may be a manually driven vehicle and/or may be configured to operate in a fully autonomous (e.g., driverless) mode or a partially autonomous mode and may include any powertrain such as a gasoline engine, one or more electrically-actuated motor(s), a hybrid system, etc.

The vehicle 102 may include a plurality of exterior lights 106 (and interior lights, not shown) including, but not limited to, puddle lights 106a, running board lights 106b, headlights 106c, and/or the like. The vehicle 102 may operate/illuminate one or more of these exterior lights 106 as "welcome lights" or approach lights when the user 104 approaches the vehicle 102. Specifically, the vehicle 102 may automatically activate the exterior lights 106 when the user 104 approaches the vehicle 102 and is located within a predefined distance range (e.g., 10-15 feet) of the vehicle 102. The purpose of these welcome lights is to "greet" the user 104 when the user 104 approaches the vehicle 102, illuminate the areas close to the vehicle 102 to make the approach convenient and comfortable for the user 104, and enhance the vehicle's aesthetic appeal.

In some aspects, the vehicle 102 may detect the user's approach towards the vehicle 102 by detecting the presence of user's phone (used as Phone-as-a-key (PaaK)) and/or key fob in proximity to vehicle 102. The user's phone and key fob (that the user 104 may be carrying) are collectively referred to as a portable device 108 in the present disclosure. In an exemplary aspect, the vehicle 102 may use inputs captured by a vehicle's sensor unit 110 to detect the presence of the portable device 108 in proximity to the vehicle 102. The sensor unit 110 may include a plurality of transceivers that may enable the sensor unit 110 to detect the presence and movement of the portable device 108 in proximity to the vehicle 102. In an exemplary aspect, the sensor unit 110 may include a Low Frequency (LF) transceiver 112, a Bluetooth Low Energy (BLE) transceiver 114, an Ultra-Wideband (UWB) transceiver 116, and a Global Positioning System (GPS) receiver 118.

The sensor unit 110 may use the LF transceiver 112 to detect the presence of the portable device 108 in proximity to the vehicle 102, e.g., when the portable device 108 is a key fob. To detect the presence of the key fob in proximity to the vehicle 102, the LF transceiver 112 may transmit an LF challenge or polling signal (e.g., at a frequency of 125 kHz) towards the key fob, and receive an Ultra High Frequency (UHF, typically at a frequency of 315 or 433 MHz) response signals from the key fob in return. Responsive to receiving the response signals, the sensor unit 110 may detect the presence of the key fob in proximity to the vehicle 102.

Further, the sensor unit 110 may use the BLE transceiver 114 and the UWB transceiver 116 to detect the presence and movement of the portable device 108 in proximity to the vehicle 102, e.g., when the portable device 108 is a phone (PaaK). In this case, the BLE transceiver 114 and the UWB transceiver 116 may transmit (and receive in return from PaaK) BLE and UWB signals (typically at 2.4 GHz and 6-10 GHz respectively), and detect the presence and movement of PaaK in proximity to the vehicle 102 based on the received signals. In some aspects, the BLE signals may help in detecting the portable device's presence, and the UWB signals may help in detecting the precise location (and hence the movement) of the portable device 108 in proximity to the vehicle 102.

The GPS receiver 118 may not be used to detect presence and movement of the portable device 108 in proximity to the vehicle 102, but may instead be used to identify the vehicle's geolocation based on GPS signals.

Responsive to detecting that the portable device 108 is located within the predefined distance range (e.g., 10-15 feet) of the vehicle 102 based on the inputs/signals captured by the sensor unit 110, the vehicle 102 may automatically activate the exterior lights 106 or the "welcome lights". It may be appreciated that the transmission of LF/BLE/UWB signals by the sensor unit 110 and the activation of the exterior lights 106 may consume energy from vehicle battery 120, especially because these welcome lights are illuminated when the vehicle engine is OFF. To reduce the vehicle's key off load (KOL), the vehicle 102 disclosed in the present disclosure implements a plurality of energy optimization strategies, which are described later below.

In some aspects, in addition to the components described above, the vehicle 102 may include one or more processors 122 (or processor 122) and a memory 124. The processor 122 may be disposed in communication with one or more memory devices disposed in communication with the respective computing systems (e.g., the memory 124 and/or one or more external databases not shown in FIG. 1). The processor 122 may utilize the memory 124 to store programs in code and/or to store data for performing operations in accordance with the disclosure. The memory 124 may be a non-transitory computer-readable storage medium or memory storing a program code that may enable the processor 122 to perform operations in accordance with the present disclosure. The memory 124 may include any one or a combination of volatile memory elements (e.g., dynamic random-access memory (DRAM), synchronous dynamic random-access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.).

The processor 122 may be communicatively coupled with the sensor unit 110 and the exterior lights 106 (and other vehicle components), and may control the operation of the exterior lights 106 based on the inputs obtained from the sensor unit 110. Specifically, the processor 122 may identify one or more parameters associated with the presence and movement of the portable device 108 in proximity to the vehicle 102 based on the inputs obtained from the sensor unit 110, and control the operation of one or more exterior lights 106 based on the identified parameters and/or a real-time state of charge (SoC) level of the battery 120. Examples of the identified parameters include, but are not limited to, a real-time distance "D" between the vehicle 102 and the portable device 108, an approach speed of the portable device 108 towards the vehicle 102, information associated with a side of the vehicle 102 from where the portable device 108 is approaching the vehicle 102 (e.g., front/rear/left/right side), and/or the like.

The processor 122 controls the operation of the exterior lights 106 to optimize the battery's energy consumption, specifically to reduce KOL. The operation performed by the processor 122 to implement the energy optimization strategies is described below.

In operation, the processor 122 may first detect the distance "D" between the portable device 108 and the vehicle 102 based on the inputs obtained from the sensor unit 110, and also the real-time battery SoC level. During normal or "conventional" operation, the processor 112 would compare the distance "D" with a predefined range "R" (e.g., 10-15 feet), and illuminate the exterior lights 106 when the distance "D" is less than the predefined range "R". Stated another way, in conventional operation, the processor 112 would illuminate the exterior lights 106 whenever the user 104/portable device 108 is detected to be within the range "R" of the vehicle 102.

In accordance with the present disclosure, before illuminating the exterior lights 106, the processor 122 may compare the real-time battery SoC level with a predefined SoC level threshold (or a "predefined first SoC threshold", e.g., 50 or 60%). Responsive to detecting that the real-time battery SoC level is less than the predefined first SoC threshold, the processor 122 may reduce the predefined range "R" to a reduced range (e.g., to a "predefined first distance threshold"). The reduced range or the predefined first distance threshold may be based on the predefined first SoC threshold. For example, if the processor 122 detects that the real-time battery SoC level is less than 60% (here, 60% is the predefined first SoC threshold), the processor 122 may reduce the predefined range "R" from 10-15 feet to 8-10 feet (here, 8-10 feet is the predefined first distance threshold). As another example, if the processor 122 detects that the real-time battery SoC level is less than 50% (here, 50% is the predefined first SoC threshold), the processor 122 may reduce the predefined range "R" from 10-15 feet to 6-8 feet (here, 6-8 feet is the predefined first distance threshold). In this manner, as the real-time battery SoC level decreases, the processor 122 further reduces the range "R".

In this case, the processor 122 may cause the exterior lights 106 to illuminate when the distance "D" between the portable device 108 and the vehicle 102 is less than the reduced range or the predefined first distance threshold, as opposed to when the distance "D" is less than the range "R". This facilitates in reducing the battery's energy consumption as the exterior lights 106 illuminate when the user 104 is very close to the vehicle 102 and hence has a higher probability of actually entering the vehicle 102 (as compared to a scenario where the user 104 is just passing by or walking in proximity to the vehicle 102).

In the example scenario described above, the processor 122 may further reduce the time duration for which the exterior lights 106 stay illuminated based on the real-time battery SoC level. For example, if the "standard" time duration for the illumination of the exterior lights 106 is 30 seconds, the processor 122 may reduce this standard time duration to a lower time duration or a "predefined time duration" (e.g., 20 seconds or 10 seconds), which may be based on the predefined first SoC threshold described above. Stated another way, the processor 122 may further reduce the time duration for welcome light illumination as the predefined first SoC threshold is lowered. For example, the reduced time duration may be 25 seconds when the predefined first SoC threshold is 60% and may be 15 seconds when the predefined first SoC threshold is 50%. This facilitates in reducing the battery's energy consumption as the exterior lights 106 illuminate for a shorter time duration as the battery SoC level starts to decrease. In this case, the processor 122 may cause the exterior lights 106 to illuminate for the reduced time duration or the predefined time duration, responsive to detecting that the real-time battery SoC level is less than the predefined first SoC threshold and the distance "D" is less than the predefined first distance threshold described above.

In some aspects, in addition or alternative to reducing the range "R" and the standard time duration for illumination as described above, the processor 122 may reduce the brightness or intensity of the illuminated lights based on the real-time battery SoC level. Superficially, in this case, the processor 122 may reduce the "standard" light brightness to a predefined "reduced" brightness, which may be based on the predefined first SoC threshold described above. For example, the reduced brightness may be 60% of the standard brightness when the predefined first SoC threshold is 60% and may be 40% of the standard brightness when the predefined first SoC threshold is 50%. In this case, the processor 122 may cause the exterior lights 106 to illuminate at the predefined reduced brightness responsive to detecting that the real-time battery SoC level is less than the predefined first SoC threshold and the distance "D" is less than the predefined first distance threshold described above. In some aspects, the processor 122 may additionally cause the exterior lights 106 to illuminate in a predefined color, based on the predefined first SoC threshold. For example, the processor 122 may cause the exterior lights 106 to illuminate in white color when the predefined first SoC threshold is 60%, and may cause the exterior lights 106 to illuminate in amber color when the predefined first SoC threshold is 40%. The changing color of the exterior lights 106 may provide an indication to the user 104 that the battery SoC level is decreasing.

In further aspects, the processor 122 may implement one or more additional energy optimization strategies that may or may not be dependent on the battery SoC level. For example, in one exemplary aspect, the processor 122 may adjust the predefined range "R" described above based on the approach speed of the user 104/portable device 108 towards the vehicle 102. As an example, the processor 122 may reduce the predefined range "R" when the user 104/portable device 108 is approaching the vehicle 102 at a slower speed, and may not reduce the predefined range "R" (or reduce minimally) when the user 104/portable device 108 is approaching the vehicle 102 at a faster speed. In this case, the processor 122 may adjust the predefined range "R" to a predefined second distance threshold (that may be based on the approach speed), and may cause the exterior lights 106 to illuminate responsive to detecting that the distance "D" is less than the predefined second distance threshold. In this exemplary aspect, the processor 122 may illuminate the exterior lights 106 earlier (when the user 104 is still some distance away from the vehicle 102) when the user 104/portable device 108 is approaching the vehicle 102 at a faster speed, and illuminate the exterior lights 106 later (when the user 104 is relatively closer to the vehicle 102) when the user 104/portable device 108 is approaching the vehicle 102 at a slower speed. This facilitates in reducing the battery's energy consumption as the exterior lights 106 are not unnecessarily illuminated when the user 104 is approaching slowly towards the vehicle 102 and is still relatively far away from the vehicle 102.

Figure 2:
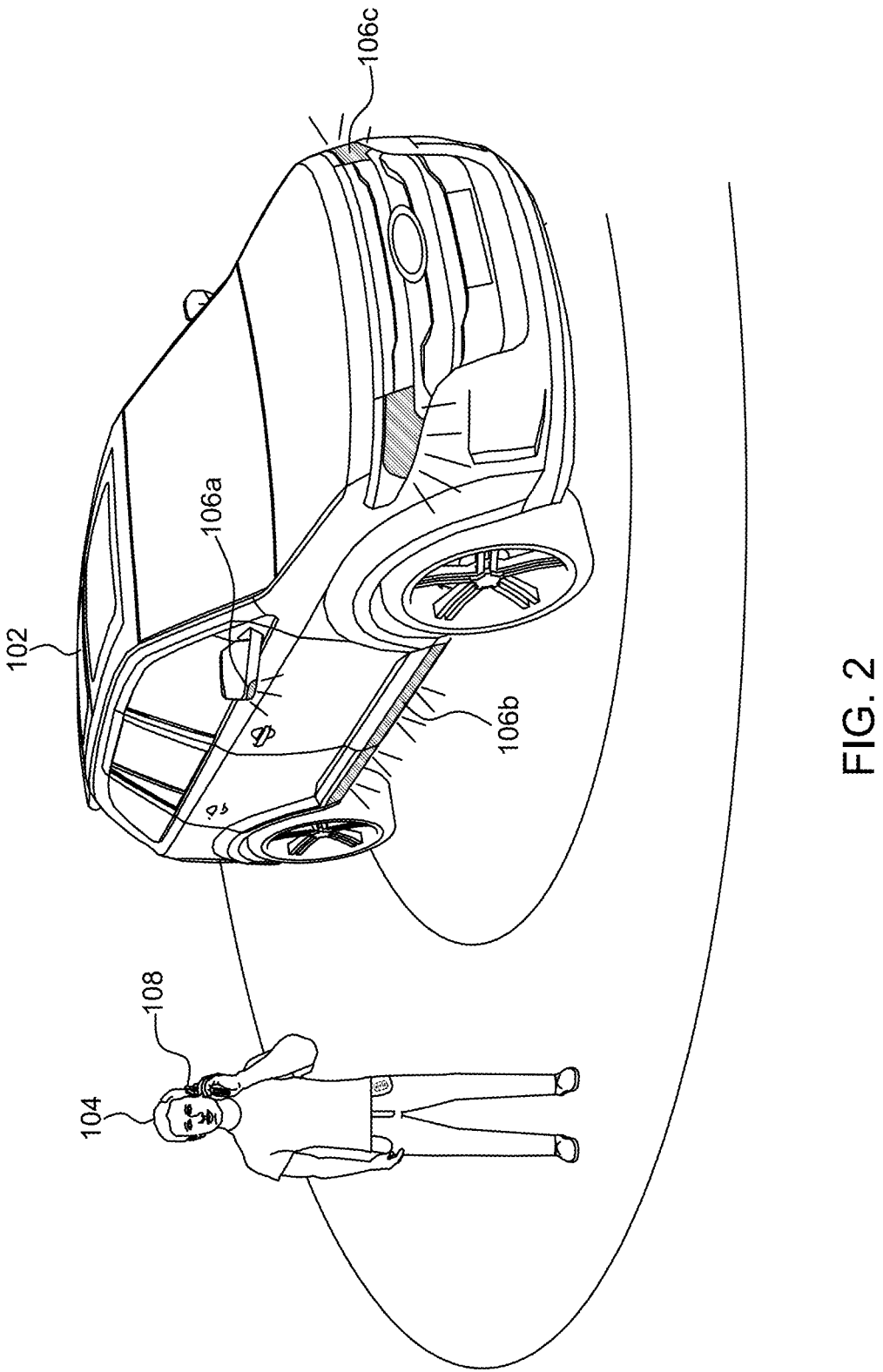
FIG. 2 depicts an example view of a user moving in proximity to a vehicle in accordance with the present disclosure.

As another energy consumption optimization strategy, the processor 122 may reduce the predefined range "R" when the processor 122 detects that the user 104/portable device 108 has approached towards the vehicle 102 a predefined count of times but has not entered the vehicle 102. For example, the processor 122 may reduce the predefined range "R" from 10-15 feet to 4-5 feet when the processor 122 detects that the user 104/portable device 108 has approached towards the vehicle 102 3 or 4 times but has not entered the vehicle 102. This helps in preventing unnecessary illumination of the exterior lights 106 when, e.g., the user 104 may be walking to-and-fro adjacent to the vehicle 102 (e.g., talking on the phone, as shown in FIG. 2) but has no intention of entering the vehicle 102.

In this case, the processor 122 may initially cause the exterior lights 106 to illuminate whenever the distance "D" is less than the predefined range "R". The processor 122 may then adjust the predefined range "R" to a predefined third distance threshold (which may be less than the predefined range "R") responsive to identifying that the user 104/portable device 18 has not entered the vehicle 102 or is not located in the vehicle's interior portion after the user 104/portable device 108 has approached the vehicle 102 for a predefined count of times (e.g., 3-4 times). Stated another way, the processor 122 may reduce the predefined range "R" to the predefined third distance threshold responsive to identifying that the distance "D" has become less than the predefined range "R" for 3-4 times, but the user 104/portable device 108 has still not entered the vehicle 102 (determined based on the inputs obtained from the sensor unit 110). Responsive to adjusting the redefined range "R" to the predefined third distance threshold, the processor 122 may cause the exterior lights 106 to illuminate the next time when the distance "D" becomes less than the predefined third distance threshold (instead of the predefined range "R").

As another energy consumption optimization strategy, the processor 122 may select an optimal exterior light 106 (from the plurality of exterior lights 106) based on the distance "D" between the user 104/portable device 108 and the vehicle 102, and cause the selected optimal exterior light 106 to illuminate. For example, the processor 122 may illuminate only the headlights 106*c* when the user 104/portable device 108 is 10-15 feet away from the vehicle 102, and may additionally (or alternatively) illuminate the puddle lights 106*a* when the user 104/portable device 108 gets closer to the vehicle 102 (e.g., within 5-7 feet). This facilitates in reducing the battery energy consumption as all the exterior lights 106 are not unnecessarily illuminated (e.g., when the user 104 may still be some distance away from the vehicle 102), and only the required or optimal exterior lights are illuminated based on the distance "D".

Figure 3:
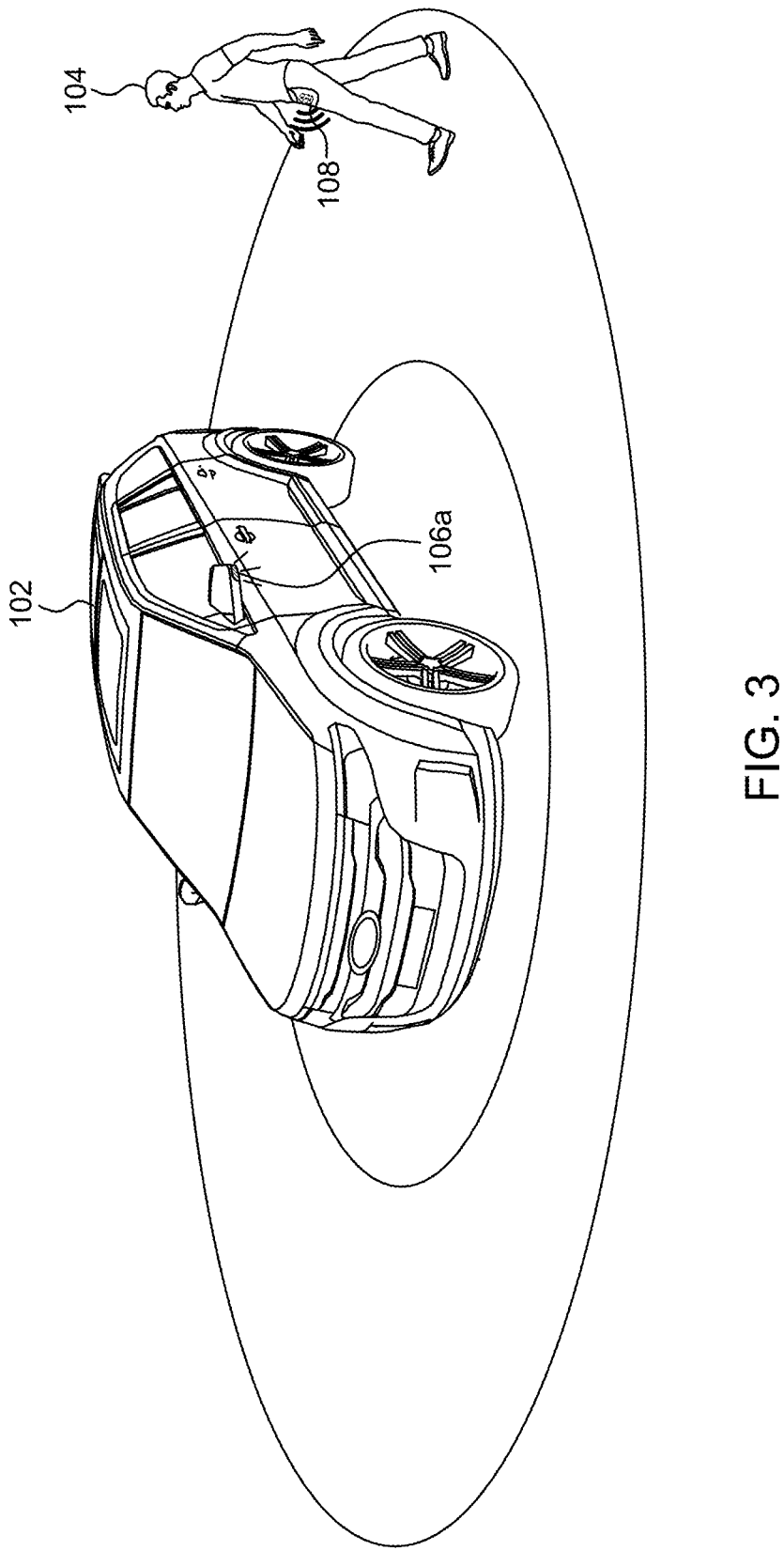
FIG. 3 depicts an example view of a user approaching a vehicle from a driver sitting area's side in accordance with the present disclosure.

In further aspects, the processor 122 may detect the side of the vehicle 102 from where the user 104/portable device 108 is approaching the vehicle 102 (based on the inputs obtained from the sensor unit 110), and illuminate only those exterior lights 106 that are present on the approach side (and not on other vehicle sides), when, e.g., the real-time battery SoC level may be low (e.g., less than a predefined second SoC threshold). As an example, in this case, the processor 122 may first detect that the real-time battery SoC level is less than the predefined second SoC threshold (e.g., 50%). Responsive to such detection, the processor 122 may detect the side of the vehicle 102 from where the user 104/portable device 108 may be approaching the vehicle 102 based on the inputs obtained from the sensor unit 110. Responsive to detecting that the user 104/portable device 108 is approaching a first side (e.g., a driver sitting area's side) of the vehicle 102, the processor 122 may select one or more exterior lights 106 that are located on the driver sitting area's side and cause only the selected exterior lights 106 to illuminate. For example, as shown in FIG. 3, the processor 122 may illuminate the exterior lights 106 located on the driver sitting area's side when the user 104/portable device 108 is approaching the driver sitting area's side. This facilitates in reducing the battery's energy consumption as only a subset of exterior lights 106 are illuminated as the user 104/portable device 108 approaches the vehicle 102. As another approach, with depleting battery SoC level, the processor 122 may illuminate only the puddle light 106a on the driver sitting area's side and not illuminate the running board lights 106b and the headlights 106c, to further conserve battery energy.

The processor 122 may implement one or more additional strategies to optimize the battery's energy consumption during key off periods. For example, the processor 122 may cause the sensor unit 110 to reduce the frequency of transmission of the LF/BLE/UWB polling or challenge messages/signals to the portable device 108, responsive to detecting that the battery SoC level is low (e.g., less than a predefined third SoC threshold). As another strategy to reduce KOL, the processor 122 may cause the sensor unit 110 to transmit only BLE/UWB polling/challenge signals and not LF signals, when the battery SoC level may be low. As may be appreciated, since transmitting LF signals consumes more battery energy than transmitting BLE/UWB signals, the processor 122 stops the transmission of LF signals when the SoC level is low to conserver battery energy. By implementing this strategy, the sensor unit 110 may detect the presence and movement of only PaaK in proximity to the vehicle 102 to illuminate the exterior lights 106, and not the key fob.

In yet another exemplary aspect, the processor 122 may illuminate the exterior lights 106 in a predefined manner (e.g., a first predefined manner) when the user 104 may be carrying a key fob (i.e., when the portable device 108 is a key fob), and in another predefined manner (e.g., a second predefined manner, which may be different from the first predefined manner) when the user 104 may be carrying a phone (i.e., when the portable device 108 is PaaK). As an example, the processor 122 may illuminate only the puddle lights 106a when the key fob is detected by the processor 122 in proximity to the vehicle 102, and may illuminate all the exterior lights 106 when the phone is detected (or vice-versa).

In further aspects, the memory 124 may store user preferences for illumination of the exterior lights 106 (that the vehicle 102 may obtain from the user 104 via a vehicle Human-Machine Interface (HMI) or a user device), and the processor 122 may control the operation of the exterior lights 106 based on the user preferences. The user preferences may be associated with predefined times of a day when the exterior lights 106 should be illuminated or should not be illuminated, predefined geolocations where the exterior lights 106 should be illuminated or should not be illuminated, predefined days when the exterior lights 106 should be illuminated or should not be illuminated, and/or the like. For example, the user preferences may indicate that the user 104 prefers the exterior lights 106 to illuminate when the vehicle 102 is located at the user's office and not when the vehicle 102 is located at the user's home. In this case, the processor 122 may detect the real-time vehicle geolocation based on inputs obtained from the GPS receiver 118, and may illuminate the exterior lights 106 when the real-time vehicle geolocation is the same as the user's office location (and not when it is the same as the user's home location).

As another example, the user preferences may indicate that the user 104 prefers the exterior lights 106 to not illuminate when the vehicle 102 is located at "unknown locations", which may be defined as those locations where the vehicle 102 was not located for at least 10 times (or a predefined count of times). In this case, the memory may store information associated with the locations where the vehicle 102 has traveled historically, and the processor 122 may use this information and the real-time vehicle geolocation to identify whether the vehicle 102 is located at a known location or an unknown location. Responsive to identifying that the vehicle 102 is located at an unknown location, the processor 122 may disable the welcome light feature and may not illuminate the exterior lights 106 when the user 104/portable device 108 approaches the vehicle 102.

The processor 122 may further "remember" or "learn" user's movement pattern (or the portable device's movement pattern) in proximity to the vehicle 102 when the user 104 is located at predefined locations (e.g., the user's home, office, etc.), and may illuminate or not illuminate the exterior lights 106 based on the learned movement pattern. For example, if the movement pattern indicates that the user 104 typically moves to-and-fro adjacent to the vehicle 102 every Sunday evening when the user 104 uses a lawn mower on the user's home garden, but never enters the vehicle 102 during this time, the processor 122 may disable the welcome light feature during this time/day (and when the vehicle 102 is located at the user's home) to conserver battery energy.

The vehicle 102 implements and/or performs operations, as described here in the present disclosure, in accordance with the owner manual and safety guidelines. In addition, any action taken by the user 104 based on indications or notifications provided by the vehicle 102 should comply with all the rules specific to the location and operation of the vehicle 102 (e.g., Federal, state, country, city, etc.). The indications or notifications, as provided by the vehicle 102, should be treated as suggestions and only followed according to any rules specific to the location and operation of the vehicle 102.

Figure 4:
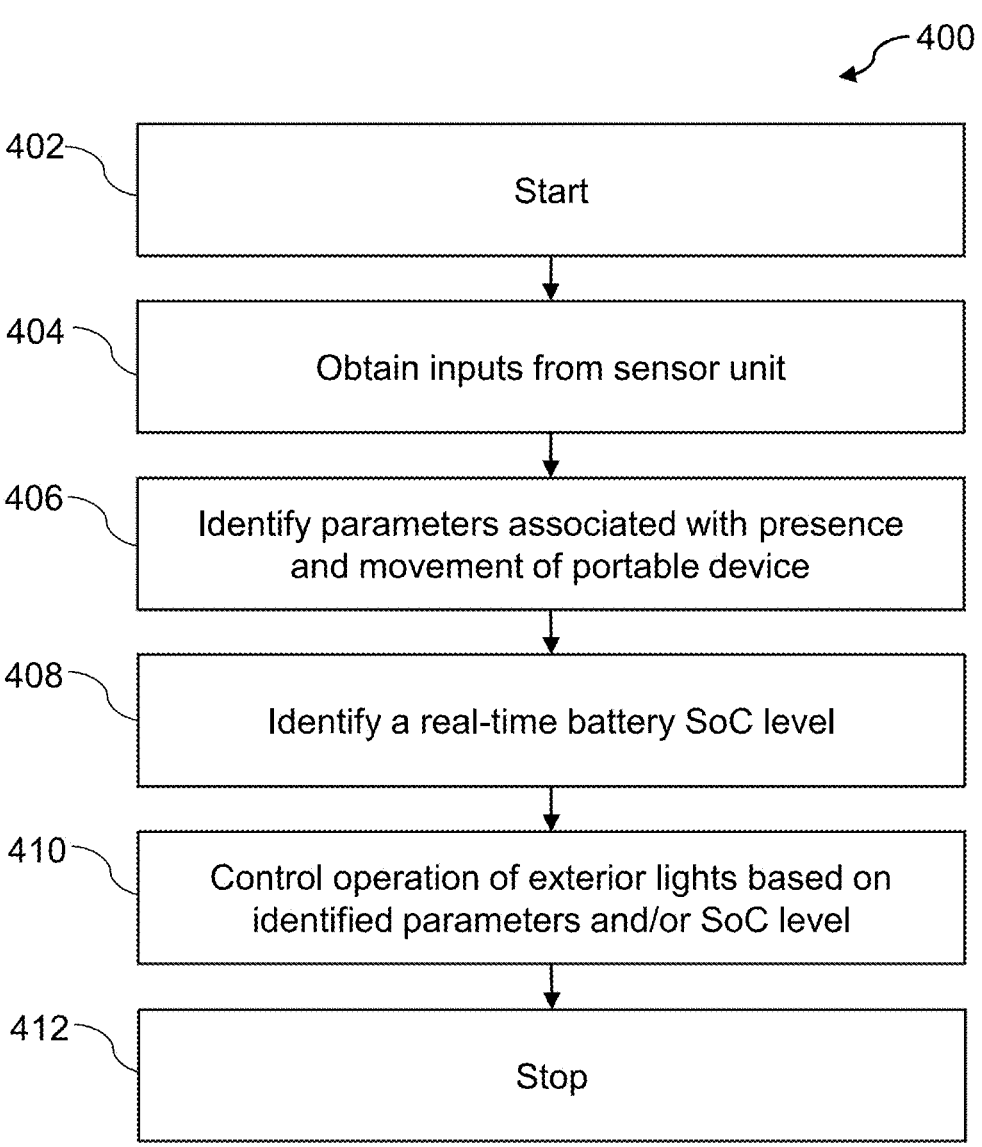
FIG. 4 depicts a flow diagram of a method for optimizing vehicle battery usage while operating welcome lights in accordance with the present disclosure.

FIG. 4 depicts a flow diagram of a method 400 for optimizing vehicle battery usage while operating welcome lights in accordance with the present disclosure. FIG. 4 may be described with continued reference to prior figures. The following process is exemplary and not confined to the steps described hereafter. Moreover, alternative embodiments may include more or less steps than are shown or described herein and may include these steps in a different order than the order described in the following example embodiments.

The method 400 starts at step 402. At step 404, the method 400 may include obtaining, by the processor 122, the inputs from the sensor unit 110. At step 406, the method 400 may include identifying, by the processor 122, one or more parameters associated with the presence and movement of the portable device 108 in proximity to the vehicle 102 based on the inputs obtained from the sensor unit 110.

At step 408, the method 400 may include identifying, by the processor 122, the real-time battery SoC level. At step 410, the method 400 may include controlling, by the processor 122, the operation of the exterior lights 106 based on the identified parameters and/or the real-time battery SoC level, as described above.

At step 412, the method 400 stops.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A vehicle comprising:
   a sensor unit configured to detect a presence and a movement of a portable device in proximity to the vehicle;
   a plurality of exterior lights;
   a battery; and
   a processor configured to:
      identify one or more parameters associated with the presence and the movement of the portable device in proximity to the vehicle based on inputs obtained from the sensor unit, wherein the one or more parameters comprise a distance between the vehicle and the portable device; and
      control an operation of at least one exterior light, from the plurality of exterior lights, based on at least one of the one or more parameters or a state of charge (SoC) level of the battery, wherein, to control the operation of the at least one exterior light, the processor:
         detects that the SoC level is less than a predefined first SoC threshold;
         detects that the distance is less than a predefined first distance threshold; and
         causes the at least one exterior light to illuminate responsive to detecting that the SoC level is less than the predefined first SoC threshold and the distance is less than the predefined first distance threshold,
      wherein the processor is further configured to cause the at least one exterior light to illuminate for a predefined time duration responsive to detecting that the SoC level is less than the predefined first SoC threshold and the distance is less than the predefined first distance threshold, and wherein the predefined time duration is based on the predefined first SoC threshold.

2. The vehicle of claim 1, wherein the predefined first distance threshold is based on the predefined first SoC threshold.

3. The vehicle of claim 1, wherein the processor is further configured to cause the at least one exterior light to illuminate at a predefined brightness or in a predefined color responsive to detecting that the SoC level is less than the predefined first SoC threshold and the distance is less than the predefined first distance threshold, and wherein the predefined brightness or the predefined color is based on the predefined first SoC threshold.

4. The vehicle of claim 3, wherein the one or more parameters comprise a distance between the vehicle and the portable device and an approach speed of the portable device towards the vehicle, and wherein, to control the operation of the at least one exterior light, the processor:

detects that the distance is less than a predefined second distance threshold, wherein the predefined second distance threshold is based on the approach speed; and
   causes the at least one exterior light to illuminate responsive to detecting that the distance is less than the predefined second distance threshold.

5. The vehicle of claim 4, wherein the one or more parameters comprise a distance between the vehicle and the portable device, and wherein, to control the operation of the at least one exterior light, the processor:

detects that the distance is less than a predefined third distance threshold;
   causes the at least one exterior light to illuminate whenever the portable device approaches the vehicle and the distance is less than the predefined third distance threshold;
   identifies that the portable device is not located in an interior portion of the vehicle after the portable device has approached the vehicle for a predefined count of times;
   adjusts the predefined third distance threshold to a predefined fourth distance threshold responsive to identifying that the portable device is not located in the interior portion of the vehicle after the portable device has approached the vehicle for the predefined count of times, wherein the predefined fourth distance threshold is less than the predefined third distance threshold; and
   causes the at least one exterior light to illuminate when the distance is less than the predefined fourth distance threshold, responsive to adjusting the predefined third distance threshold to the predefined fourth distance threshold.

6. The vehicle of claim 1, wherein the one or more parameters comprise a distance between the vehicle and the portable device, and wherein the processor is further configured to:

select an optimal exterior light, from the plurality of exterior lights, based on the distance; and
   cause the optimal exterior light to illuminate.

7. The vehicle of claim 1, wherein the one or more parameters comprise information associated with a side of the vehicle from where the portable device is approaching the vehicle, and wherein the processor is further configured to:

detect that the portable device is approaching a first side of the vehicle based on the one or more parameters;

detect that the SoC level is less than a predefined second SoC threshold;
   select a first exterior light, from the plurality of exterior lights, which is located at the first side of the vehicle, responsive to detecting that the portable device is approaching the first side of the vehicle and the SoC level is less than the predefined second SoC threshold; and
   illuminate the first exterior light.

8. The vehicle of claim 7, wherein the first exterior light is a puddle light at the first side of the vehicle.

9. The vehicle of claim 1, wherein the sensor unit detects the presence and the movement of the portable device in proximity to the vehicle by transmitting polling messages to the portable device, and wherein the processor is further configured to:

detect that the SoC level is less than a predefined third SoC threshold; and
   cause the sensor unit to reduce a frequency of transmission of the polling messages responsive to detecting that the SoC level is less than the predefined third SoC threshold.

10. The vehicle of claim 1 further comprising a memory configured to store user preferences for illumination of the plurality of exterior lights, wherein the processor is further configured to control the operation of the at least one exterior light based on the user preferences.

11. The vehicle of claim 10, wherein the user preferences are associated with at least one: predefined times of a day when the plurality of exterior lights should be illuminated or should not be illuminated, predefined geolocations where the plurality of exterior lights should be illuminated or should not be illuminated, or predefined days when the plurality of exterior lights should be illuminated or should not be illuminated.

12. The vehicle of claim 1, wherein the portable device is a key fob or a phone-as-a-key (PaaK).

13. The vehicle of claim 12, wherein the processor is further configured to illuminate the at least one exterior light in a first predefined manner when the portable device is the key fob and in a second predefined manner when the portable device is the PaaK, and wherein the first predefined manner is different from the second predefined manner.

14. The vehicle of claim 1, wherein the sensor unit comprises at least one of: a Low Frequency (LF) transceiver, a Bluetooth Low Energy (BLE) transceiver, or an Ultra-Wideband (UWB) transceiver.

15. A vehicle comprising:
   a sensor unit configured to detect a presence and a movement of a portable device in proximity to the vehicle;
   a plurality of exterior lights;
   a battery; and
   a processor configured to:
      identify one or more parameters associated with the presence and the movement of the portable device in proximity to the vehicle based on inputs obtained from the sensor unit; and
      control an operation of at least one exterior light, from the plurality of exterior lights, based on at least one of the one or more parameters or a state of charge (SoC) level of the battery,
      wherein the sensor unit detects the presence and the movement of the portable device in proximity to the vehicle by transmitting polling messages to the portable device, and wherein the processor is further configured to:

detect that the SoC level is less than a predefined third SoC threshold; and cause the sensor unit to reduce a frequency of transmission of the polling messages responsive to detecting that the SoC level is less than the predefined third SoC threshold.

5

\* \* \* \* \*